UNITED STATES PATENT OFFICE.

SADAKICHI SATOW, OF SENDAI, JAPAN.

LINOLEUM-LIKE SUBSTANCE AND PROCESS OF MAKING THE SAME.

1,245,978.     Specification of Letters Patent.     Patented Nov. 6, 1917.

No Drawing.     Application filed December 11, 1916. Serial No. 136,298.

*To all whom it may concern:*

Be it known that I, SADAKICHI SATOW, a subject of the Emperor of Japan, residing at Sendai, Japan, have made a certain new and useful Invention in Linoleum-Like Substances and Processes of Making the Same, of which the following is a specification.

This invention relates to linoleum-like substance of a new and useful composition and the process of making the same.

The object of the invention is to provide a linoleum-like substance which is easy to manufacture, strong, durable and efficient, and an economical process for making the same.

A further object of the invention is to employ vegetable proteidal substances in the manufacture of linoleum.

Further objects of the invention will appear more fully hereinafter.

The methods heretofore employed in the manufacture of linoleum and linoleum-like substances, in many instances, have proven expensive and inefficient because of the time required in carrying them out, the nature of the materials employed necessitating the rolling out of the product into sheets and a comparatively long period of time for the product to become sufficiently dry for use. If dried too rapidly the product is rendered brittle and tends to crack. No efficient method has heretofore been employed or devised, so far as I am aware, to properly and easily control the degree of hardness or softness of the product, or to diminish the time required to properly dry it without rendering it brittle and liable to crack.

It is among the special objects of my present invention to provide a linoleum product, and a process of making the same, which can be quickly, easily and economically made from proteids or proteidal substances, which may be rolled into any desired thickness, with any desired degree of hardness or softness, or which may be applied to a textile or other fabric.

In carrying out my invention I employ vegetable proteids or proteidal substances which are glutinized with suitable agents into a sticky viscid mass. This mass may be used as a coating for cloth textile or other fabric, or it may be transformed into proteidal condensation products by the action of an active methylene compound, and rolled into sheets or applied to the fabric; or to the glutinized mass, whether or not treated with the active methylene, is added suitable matter, and also cork powder, or sawdust, or a mixture of the same, or the fibrous material may be omitted and only the cork powder or sawdust or a mixture of them used, to give body to the mass which may then be applied to the fabric or rolled into sheets or other form of the desired thickness for use as linoleum.

Suitable pigments or coloring matter may also be employed, and viscous substances such as oxidized oils, triphenyl-glycerin, viscose, hydrated cellulose or gelatinized celluloses or the like may also be used.

The proteids are procured from any suitable raw proteid containing material, such as beans, peas, wheat, corn or other leguminous cereal or grain products.

The proteid containing raw material is crushed to break down the cellular structure thereof, and if it contains an undesirable percentage of oil, the oil content is removed. This may be effected in any suitable manner, as, for example, by treating the mass with an oil solvent such as benzin. The oil solvent is then removed from the mass. The proteidal substances contained in the "meal" or "proteid meal" thus produced, are separated therefrom to produce a refined proteid product. This separation of the proteidal substances from the proteid meal may be effected in various ways. According to one method the "meal" is treated with an alkaline solution, such as a dilute solution of caustic or carbonated alkali, or caustic or carbonated ammonia, and the proteidal substances, either with or without further purification of the resulting liquid, are precipitated therefrom. The further purification referred to, may be accomplished by filtration, centrifuging, or the like, by fractional precipitation, fractional solution of precipitated impure proteids, or by converting one or more components into other chemical compounds having different properties which enable their separation to be effected, or one or more of these various purifying methods may be employed in combination with the others. The precipitation of the refined proteidal substances is accomplished by adding a suitable acid such as sulfuric, sulfurous, acetic or phosphoric, or by adding a suitable ferment such as lactic or acetic.

According to another method the meal is treated with water and the refined proteidal products are precipitated out of the resulting liquid, either with or without purification thereof, as above explained, the precipitation being effected with an acid or a ferment as above described.

According to still another method the meal is treated with an aqueous salt solution, such as sodium chlorid, ammonium sulfate, or the like, and the resulting liquid either with or without further purification, as explained, is subjected to dialysis.

I have also found that in place of the refined proteids, obtained as above described, the proteid containing material either in the crude or natural state or the proteids in partially refined state, and even the refuse material left after extracting or removing the refined proteids, are suitable for use in the manufacture of linoleum, these various materials being used alone or mixed together, or mixed with refined proteids.

The proteidal substances or mixtures obtained as above described are suitable and highly efficient for use in making linoleum in accordance with my invention.

In the preparation of the linoleum the proteidal substances, obtained as above described, are subjected to the action of a glutinizing agent to produce a sticky viscid mass. I have found the following to be suitable proteid glutinizing agents, namely, (1) inorganic acids, such as phosphoric acid, sulfurous acid and the like; or (2) fatty or oxyfatty acids, such as formic, acetic, propionic, phenyl-propionic, malonic, lactic, tartaric, citric, malic, and the like; or (3) aromatic acids, such as salicylic, benzoic, or the like; or (4) phenols such as carbolic acid, creosol, resorcin, nitro-creosol, and the like; or (5) organic bases, such as pyridin, urea, anilin, glycin, naphthylamin, or other amino compounds, or the like; or (6) organic bases such as caustic alkali, or ammonia or the like; or (7) alkali salts of weak acids, such as borax, sodium phosphate and the like.

The properties of the mass thus obtained which particularly adapt it for use in the manufacture of linoleum, are greatly improved if one or more of the following compounds are added thereto, namely, difficultly drying sticky or viscid substances such as oxidized oils, triphenyl-glycerin, or the like. or hydro-cellulose, oxy-cellulose, or cellulose-esters and which I will herein call cellulose derivatives or other viscous substances; or active methylene compounds, such as formaldehyde, hexamethylenetetramin, trioxymethylene, or other aldehydes, of aliphatic and aromatic series.

The properties of the mass thus obtained are still further improved if a small quantity of alkali is added thereto.

If desired, and in order to form a body for the linoleum product, cork powder or sawdust, either alone or mixed together is added, and also, if desired, though not necessary, suitable fibrous material, such as waste hemp, cotton, wood fiber, paper, leather waste or other similar material preferably though not necessarily, possessing a long strong fiber, is added. Also, if desired, any suitable pigment or coloring matter may be added.

The manner in which my invention is carried out is illustrated in the following illustrative examples.

Example 1: The refined proteidal substances, procured as described, are kneaded with cresol, and the mass is kneaded again after the addition of oxidized castor oil. The resulting mass is kneaded a third time after adding thereto a small quantity of concentrated caustic soda solution, and a suitable quantity of powdered cork or sawdust or a mixture thereof. Finally the mass is rolled hot to the desired thickness and size.

Example 2: The proteidal substances either in the residue, crude, or refined state, or after being mixed together, are kneaded first with anilin, and the mass is again kneaded successively with trioxymethylene and caustic soda with powdered cork, and the resulting mass is applied under a hot roller to cotton cloth or other fabric and dried.

It is to be understood, of course, that my invention in its broadest scope, as defined in the claims, is not to be limited to the use of any particular raw material containing vegetable proteids, nor to any particular method of recovering or refining the proteidal substances nor to any particular glutinizing agent nor to any particular condensing agent or difficultly drying substance, nor to any particular body material.

The linoleum product produced as above described is non-inflammable. It can be easily rolled into sheets of any desired thickness or size, or applied easily, readily and quickly to any suitable cloth or fabric. It is strong, durable and economical, and can be used in any situation or finished article where linoleum is now used. By suitably varying the proportion of glutinizing or condensing agents employed, the degree of hardness or softness of the finished linoleum product may be controlled. It is immediately available for use after being rolled under hot rolls into sheets, or after being applied to a fabric and does not require a long period for drying. This characteristic materially lessens the time and hence the cost of producing the finished linoleum product.

In the case where a phenol, say, for example, cresol, is employed as a glutinizing agent, and which is in its nature a disinfectant, the linoleum product of my invention is not liable to mold, nor is it liable to be injured or damaged by the ravages of insects.

Having now set forth the objects and nature of my invention and the method of carrying the same into practical operation, what I claim as new and useful, and of my own invention, and desire to secure by Letters Patent is—

1. In the manufacture of linoleum, the process which consists in glutinizing vegetable proteids and then mixing a filler with the resulting glutinized mass.

2. In the manufacture of linoleum the process which consists in glutinizing vegetable proteids then adding a sticky viscid agent to the mass, and finally adding a filler to the mass.

3. In the manufacture of linoleum the process which consists in glutinizing vegetable proteids with a phenol and incorporating a filler into the mass.

4. In the manufacture of linoleum the process which consists in glutinizing vegetable proteids and incorporating cork powder into the glutinized mass.

5. In the manufacture of linoleum the process which consists in glutinizing vegetable proteids and incorporating cork powder and sawdust into the glutinized mass.

6. In the manufacture of linoleum the process which consists in glutinizing vegetable proteids and incorporating a fibrous material and cork powder into the glutinized mass.

7. In the manufacture of linoleum the process which consists in glutinizing vegetable proteids and incorporating a fibrous material, cork powder and sawdust into the glutinized mass.

8. In the manufacture of linoleum the process which consists in glutinizing vegetable proteids then adding cellulose derivatives and a filler to the glutinized mass.

9. In the manufacture of linoleum the process which consists in glutinizing vegetable proteids then adding cellulose derivatives and cork powder to the glutinized mass.

10. In the manufacture of linoleum the process which consists in glutinizing vegetable proteids then adding cellulose derivatives, cork powder and sawdust to the glutinized mass.

11. In the manufacture of linoleum the process which consists in glutinizing vegetable proteids then adding cellulose derivatives, cork powder, sawdust and fibrous material to the glutinized mass.

12. In the manufacture of linoleum the process which consists in glutinizing vegetable proteids then adding cellulose derivatives, a sticky viscid agent and cork powder to the glutinized mass.

13. In the manufacture of linoleum the process which consists in glutinizing vegetable proteids then adding cellulose derivatives, a sticky viscid agent, cork powder and sawdust to the glutinized mass.

14. In the manufacture of linoleum the process which consists in glutinizing vegetable proteids then adding cellulose derivatives, a sticky viscid oxidized oil, cork powder, sawdust and fibrous material.

15. In the manufacture of linoleum the process which consists in glutinizing vegetable proteids with a phenol and then incorporating cork powder into the glutinized mass.

16. In the manufacture of linoleum the process which consists in glutinizing vegetable proteids with a phenol and then incorporating cork powder and sawdust into the glutinized mass.

17. In the manufacture of linoleum the process which consists in glutinizing vegetable proteids with a phenol and then incorporating cork powder, sawdust and fibrous material into the glutinized mass.

18. In the manufacture of linoleum the process which consists in glutinizing vegetable proteids with a phenol, then adding cellulose derivatives to the mass and incorporating therein a filler including cork powder.

19. In the manufacture of linoleum the process which consists in glutinizing vegetable proteids with a phenol, then adding a sticky viscid agent to the mass and incorporating therein a filler including cork powder.

20. In the manufacture of linoleum the process which consists in glutinizing vegetable proteids with a phenol, then adding viscose to the mass and incorporating therein a filler including cork powder.

21. In the manufacture of linoleum the process which consists in glutinizing vegetable proteids with a phenol, then adding gelatinized cellulose to the mass and incorporating therein a filler including cork powder.

22. In the manufacture of linoleum the process which consists in glutinizing vegetable proteids, then mixing an active methylene compound with the glutinized mass and incorporating therein a filler including cork powder.

23. In the manufacture of linoleum the process which consists in glutinizing vegetable proteids with a phenol, and then mixing with the mass an oxidized oil and a filler including cork powder.

24. In the manufacture of linoleum the process which consists in glutinizing vegetable proteids, then mixing therewith a sticky viscid agent, an active methylene compound and a filler including cork powder.

25. In the manufacture of linoleum the process which consists in glutinizing vegetable proteids, then mixing therewith a sticky viscid agent, cellulose derivatives, an active methylene compound and a filler including cork powder.

26. In the manufacture of linoleum the process which consists in glutinizing vegetable proteids and then adding viscose triphenyl-glycerin and a filler including cork powder to the mass.

27. In the manufacture of linoleum the process which consists in glutinizing vegetable proteids and then adding triphenyl-glycerin, cellulose derivatives and a filler including cork powder to the mass.

28. In the manufacture of linoleum the process which consists in glutinizing vegetable proteids with a phenol, then mixing with the glutinized mass an active methylene compound, and alkali and a filler including cork powder.

29. In the manufacture of linoleum the process which consists in glutinizing vegetable proteids and then mixing with the glutinized mass an oxidized oil, and active methylene compound, an alkali and a filler including cork powder.

30. In the manufacture of linoleum the process which consists in glutinizing vegetable proteids with a phenol, then mixing with the glutinized mass an active methylene compound, an oxidizing oil, an alkali and a filler including cork powder.

31. In the manufacture of linoleum the process which consists in separating the vegetable proteids from proteid containing material, then glutinizing the separated proteids and mixing a filler including cork powder with the glutinized mass.

32. In the manufacture of artificial leather the process which consists in separating in a liquid the vegetable proteids of proteid containing raw material, then precipitating the proteidal substances from the liquid and glutinizing the precipitated proteidal substances and adding a filler including cork powder to the resulting glutinized mass.

33. As a new article of manufacture, linoleum consisting of glutinized vegetable proteids having a filler including cork powder incorporated into the glutinized mass.

34. As a new article of manufacture, linoleum consisting of glutinized vegetable proteids containing an active methylene compound and a filler including cork powder.

35. As a new article of manufacture, linoleum consisting of glutinized vegetable proteids containing an active methylene compound, fibrous material and cork powder.

36. As a new article of manufacture, linoleum consisting of glutinized vegetable proteids containing an oxidized oil and a filler including cork powder.

37. As a new article of manufacture, linoleum consisting of glutinized vegetable proteids containing a sticky viscid agent and a filler including cork powder.

38. As a new article of manufacture, linoleum consisting of glutinized vegetable proteids containing a sticky viscid agent, fibrous material and cork powder.

39. As a new article of manufacture, linoleum consisting of glutinized vegetable proteids, an active methylene agent, an oxidized oil and a filler including cork powder.

40. As a new article of manufacture linoleum consisting of glutinized vegetable proteids, cellulose derivatives and a filler including cork powder.

41. As a new article of manufacture linoleum consisting of glutinized vegetable proteids, an active methylene compound, an alkali and a filler including cork powder.

42. In the manufacture of linoleum the process which consists in glutinizing vegetable proteids, then incorporating into the glutinized mass a filler including cork powder, and finally rolling the mass into sheets.

43. In the manufacture of linoleum the process which consists in glutinizing vegetable proteids, then incorporating into the glutinized mass a filler including cork powder, and finally rolling the mass onto a fabric.

In testimony whereof I have hereunto set my hand on this 1st day of December, A. D. 1916.

SADAKICHI SATOW.